United States Patent
Halimeh et al.

(10) Patent No.: US 8,582,809 B2
(45) Date of Patent: Nov. 12, 2013

(54) METHOD AND DEVICE FOR DETECTING AN INTERFERING OBJECT IN A CAMERA IMAGE

(75) Inventors: Jad Halimeh, München (DE); Stephan Simon, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 203 days.

(21) Appl. No.: 13/135,012

(22) Filed: Jun. 22, 2011

(65) Prior Publication Data

US 2012/0008866 A1    Jan. 12, 2012

(30) Foreign Application Priority Data

Jun. 28, 2010   (DE) .......................... 10 2010 030 616

(51) Int. Cl.
*G06K 9/00* (2006.01)
*H04N 5/225* (2006.01)

(52) U.S. Cl.
USPC .......................................... 382/103; 348/169

(58) Field of Classification Search
USPC .......... 382/103, 107, 236, 190; 348/143, 154, 348/155, 169, 170, 171, 172, 208.1, 208.02, 348/208.16, 352, 208.2
See application file for complete search history.

(56) References Cited

U.S. PATENT DOCUMENTS

| 6,031,568 A * | 2/2000 | Wakitani ....................... 348/169 |
| 7,812,869 B2 * | 10/2010 | Boettiger ....................... 348/262 |
| 8,385,595 B2 * | 2/2013 | Liu et al. ....................... 382/103 |

* cited by examiner

*Primary Examiner* — Abolfazl Tabatabai
(74) *Attorney, Agent, or Firm* — Kenyon & Kenyon LLP

(57) ABSTRACT

A method for detecting an interfering object in a camera image of a camera image sequence includes: reading in a first pixel data value of a predetermined position in a first camera image obtained at a first point in time, a second pixel data value of the predetermined position in a second camera image obtained at a second point in time after the first point in time, and a third pixel data value of the predetermined position in a third camera image obtained at a third point in time after the second point in time; ascertaining a reference value on the basis of the second pixel data value and a comparison value on the basis of the first pixel data value and/or the third pixel data value; and detecting the interfering object at the predetermined position when the reference value is in a predefined relationship with the comparison value.

16 Claims, 5 Drawing Sheets

METHOD AND DEVICE FOR DETECTING AN INTERFERING OBJECT IN A CAMERA IMAGE

BACKGROUND OF THE INVENTION

1. Field of the Invention

The present invention relates to a device and a method for detecting an interfering object in at least one camera image of a camera image sequence and eliminating the interfering object in the camera image sequence.

2. Description of the Related Art

Methods for detecting accumulated snow are well-known. However, the detection of snowfall, i.e., of floating snowflakes, using a camera, is problematic.

BRIEF SUMMARY OF THE INVENTION

Against this background, the present invention sets forth a method for detecting an interfering object in at least one camera image of a camera image sequence, a method for eliminating the interfering object in the camera image sequence, furthermore, a device that utilizes this method, and finally, a corresponding computer program product.

The present invention provides a method for detecting an interfering object in at least one camera image of a camera image sequence, the method having the following steps: reading in a first pixel data value at a predetermined position in a first camera image or in the surroundings depicted in the first camera image, a second pixel data value at the predetermined position in a second camera image or in the surroundings depicted in the second camera image, and a third pixel data value at the predetermined position in a third camera image or in the surroundings depicted in the second camera image, the first camera image having been picked up at a first time, the second camera image having been picked up at a second time after the first time, and the third camera image having been picked up at a third time after the second time; ascertaining a reference value on the basis of the second pixel data value and a comparison value on the basis of the first pixel data value and/or the third pixel data value; and detecting the interfering object at the predetermined position when the reference value is in a predefined relationship with the comparison value.

The interfering object may include, for example, snowfall or other possibly disruptive objects, such as falling or whirled-up leaves, hail, drops, birds, or insects in image sequence data of a camera. In this context, the camera may be moving or stationary. Possible fields of application for the method include, in particular, driver assistance technology, but also safety and monitoring technology, robotics and the like. Millions of security cameras are already on the market. At present and in the coming years, driver assistance cameras are taking the step from smaller quantities in the upper middle class and above that to a broader market coverage up to the compact class. Such driver assistance cameras are often equipped with a so-called "rolling-shutter" technology, which supplies photographs of the vehicle surroundings line-by-line or column-by-column. In the case of the camera images of the camera image sequence, this may be photographs of a scene in front of the wind shield of the vehicle, which are taken in succession, for example, by the video camera of the driver assistance system of the vehicle during a trip of the vehicle. The first, second and third pixel data values may be, for example, a gray scale value or a color component value of the pixel at the predetermined position, the magnitude of the value being able to be different in each of the three camera images. The predetermined position may be mathematically represented in a coordinate system, using, for example, an x and a y value. The intervals between the first, second and third times may lie, for example, in the nanosecond to second range. The first, second and third times may be a certain time scale, during which the scenery of the vehicle surroundings is irradiated by the camera. The pixel data values may be read in, for example, by providing signals associated with each of the pixel data values to a control unit. For example, the reference value may be ascertained in the control unit using a suitable algorithm and may form an index for relating the second pixel data value to the first and/or third pixel data values. The comparison value may be ascertained in the control unit using a further, suitable algorithm and may form an index for relating the first and/or third pixel data values to the second pixel data value. The comparison value may be ascertained, for example, only on the basis of the first pixel data value, or only on the basis of the third pixel data value, or on the basis of a correlation or a value, using the first pixel data value, with the third pixel data value. To detect the interfering object, the reference value and the comparison value may be included in an algorithm calculation. The predetermined interrelationship may, for example, manifest itself in such a manner, that the interfering object is detected in the second camera image if, when representing the first, second and third pixel data values in a coordinate system, a difference of the first and second pixel data values corresponds to a further difference of the third and second pixel data values.

The present invention also provides a device for detecting an interfering object in at least one camera image of a camera image sequence, the device having the following features: a device for reading in a first pixel data value at a predetermined position in a first camera image or in the surroundings depicted in the first camera image, a second pixel data value at the predetermined position in a second camera image or in the surroundings depicted in the second camera image, and a third pixel data value at the predetermined position in a third camera image or in the surroundings depicted in the third camera image, the first camera image having been picked up at a first time, the second camera image having been picked up at a second time after the first time, and the third camera image having been picked up at a third time after the second time; a device for ascertaining a reference value on the basis of the second pixel data value and a comparison value on the basis of the first pixel data value and/or the third pixel data value; and a device for detecting the interfering object at the predetermined position when the reference value is in a predefined relationship with the comparison value.

The present invention is based on the observation that interfering objects between a camera and a scene to be monitored are only situated temporarily at the location in question, for due to their short distance from the camera, they execute a large movement in the image, even when in reality, the absolute movement or the movement relative to the camera is small. Therefore, the movement of an interfering object in the image is ordinarily large, for the most part, considerably greater than the movement of scene objects, persons, vehicles, traffic signs, markings, etc. In addition, the movement of interfering objects is usually too great to be able to determine using an image-based motion estimation method. In the case of snowflakes or similar objects flying around and, in particular, a moving camera, a lack of uniqueness in the appearance of the flakes, as well as a constantly changing arrangement of the flakes in the image prevent a reliable motion estimation. Often, the movement of a nearby snowflake in the image is even so large that the human observer himself or herself has difficulties clearly finding it again in the preceding image. Therefore, the objective may be described as the detection of objects that suddenly appear and immediately disappear again from the camera-image sequence.

The approach of the present invention provides the advantage that in the form of a method or of a device, it is easily implementable in real time as an additional component on image processing platforms available today. It is particularly suited for use as a pre-processing step for identifying all important interfering objects, thus, e.g., the largest or most conspicuous or most disruptive interfering objects in the image, so that, e.g., subsequent computer vision algorithms may benefit from this information. It is also possible to eliminate the disturbances, i.e., to generate an interference-free or lower-interference image, with which subsequent algorithms may work without further precautions.

Accordingly, the approach set forth here may be of interest, for example, in connection with an application of an ACC radar sensor in a vehicle, for in the case of snowfall, such a device is prone to becoming clogged with snow under certain temperature and moisture conditions. The sensor then becomes nonfunctional, sometimes without the driver receiving an acknowledgment. To be sure, radar sensors are normally equipped with a lens heater that is supposed to melt the snow. However, the heater functions counterproductively under certain circumstances: if the heating power does not suffice in view of the outside temperature and the amount of snowfall, then the heater may only cause melting on the upper surface, to which the snow more easily adheres due to the moisture. In this situation, it is more favorable to leave the heater switched off; the radar sensor then remains dry and snow-free. This problem may be at least partially solved by video snowfall detection in accordance with the approach presented here, and possibly with further known parameters, e.g., the temperature.

In the development of algorithms for future driver assistance systems, it is apparent that the camera-based driver assistance functions are presently undergoing a further development of simple, comfort-supporting functions, such as night vision assistance, warning of persons, adaptive lamp control, lane change warning, traffic sign detection, ACC support, etc., up to safety-related, intervening functions. While, in the case of comfort functions, the effect of measuring errors of the video sensor may still be suppressed, or tolerated or overridden by the driver, this is no longer valid for intervening functions such as automatic emergency braking. This has resulted in required false-positive detection probabilities that are orders of magnitude less than in the case of comfort functions. Typically, the distance between the camera and the monitored objects is several meters to several tens of meters. In the normal case, only the transparent medium of air and/or glass pane and occasionally water drops are situated in the space between them. Dense snowfall or other whirled-up objects appear only very rarely in this space. Accordingly, in the image sequence data recorded and used, e.g., for development and testing, such cases are correspondingly represented even more rarely. The approach presented here may reduce the probability of a critical case, e.g., an unfortunate combination of a vehicle in the background and partial concealment by a floating object in the foreground, which could perhaps lead to a false detection of a driver assistance system not supported in accordance with the approach presented here, since this case was perhaps never to be seen during the development and testing phase of the driver assistance system. The approach presented here provides the advantage of simplifying this problem, namely, by detecting the snowflakes or the generally concealing objects in the first step, and by detecting and tracking road users and the like in the second step, in which the instances of concealment by interfering objects are known.

However, even more reasons may be advanced as to why it is useful to detect snowfall and other floating objects. For example, in the case of rapidly driving by a traffic sign, there are only very few images suitable for detecting the sign. For example, if the traffic sign is too far away, it is represented as too small in the image; if it is too close, this produces, at least at night, a blurred image due to motional unsharpness diffuseness in the case of relatively long exposure time. In this case, only very few images from the image sequence would be usable. A snowflake in front of an otherwise usable image may then easily result in false detection and, consequently, in inconsistency with the remaining images. As such, the detection of the snowflake according to the method presented here provides, in this case, the advantage that the inconsistency may be resolved. Something similar applies, for example, to following or tracking and detection of objects, persons, traffic lanes, as well as to estimation of object motion and egomotion. In each case, knowledge of the existence of an instance of concealment, e.g., by a snowflake, may be advantageously utilized. For the above-mentioned reasons, it is useful to fulfill the objective of detecting floating snowflakes, leaves and the like. The present invention provides a simple and practical solution, which may be integrated into computer vision systems as a pre-processing step.

According to a specific embodiment, in the step of detecting the interfering object at the predetermined position, it may be detected when the first pixel data value and the third pixel data value each have a value that is within a predefined, common tolerance range. For example, in light of a difference of the first and the third pixel data values that lies within the tolerance range, e.g., the first pixel data value may readily be taken as a basis for calculating the comparison value, while the third pixel data value may be used for verifying the first. Or conversely, the third pixel data value may be used for calculating the comparison value, and the first pixel data value may be used for verification. On the basis of this option for variation, different algorithms may possibly be used for calculating the comparison value. In addition, in the step of detecting the interfering object at the predetermined position, it may be detected if a first ratio of the reference value to the comparison value is within a tolerance range for a second ratio of the reference value to a further comparison value. In this context, the further comparison value may have been determined on the basis of the third pixel data value. Thus, using two arithmetic operations executed independently of one another, it may advantageously be determined in a simple manner, whether or not the interfering object is present in the second camera image.

In addition, in the step of detecting the interfering object at the predetermined position, it may be detected when the reference value differs from the comparison value by more than a predefined quantity. Thus, the computing capacity may be advantageously dispensed with for determining the tolerance range, and the step of detecting the interfering object may be configured to be even simpler and more robust.

Furthermore, in the detecting step for the predetermined relationship, a difference or a ratio of the reference value and the comparison value may be calculated. Thus, e.g., different algorithms may be used for both the step of calculating the relationship between the comparison value and the reference value and the step of detecting the interfering object. This advantageously increases the number of fields of application of the method presented here.

Furthermore, a difference of the reference value and the comparison value and/or the further comparison value may be determined in the detecting step. A probability of the presence of the interfering object at the predetermined position may be identified on the basis of the difference. This provides the advantage that a continuous index for the detection of the interfering object is made available. In addition, in the case of an apparent, relatively high probability of a presence of the interfering object, further methods for testing this assumption may possibly be initiated. In this manner, it may be possible for a result to be obtained more rapidly and more reliably.

According to a further specific embodiment, the method may include a step of determining one-dimensional structures or intersections of one-dimensional structures in at least one of the camera images of the camera image sequence. Accordingly, in the step of detecting at the predetermined position, no interfering object is detected when a one-dimensional structure or an intersection of one-dimensional structures was determined at the predetermined position. The one-dimensional structures may include, for example, a horizontal or vertical edge of vehicle superstructural parts or traffic signs. A headlight or tail light of a vehicle may also appear in a camera image as a one-dimensional structure. For example, the step of detecting one-dimensional structures may be implemented by high-pass filtering the image signals of one camera image or all of the camera images. Thus, for example, vertical edges of traffic signs or superstructural parts of vehicles may be advantageously prevented from being mistakenly identified as interfering objects due to high traveling speed.

According to a further specific embodiment, the method may include a step of measuring a snow density. In this, a ratio of a number of predetermined positions in the image, at which interfering objects, in particular, interfering objects having a minimum size, were detected, to a number of positions in a camera image, is taken. In this manner, the snow thickness may be measured. If a dimension of the snow density is identified, then, on the basis thereof, it may be decided, e.g., if it is useful to activate a lens heater of a radar sensor installed in the vehicle.

The present invention also provides a method for eliminating the interfering object in the camera image sequence, the method having the following steps: the steps according to the previously explained method of detecting the interfering object in a camera image of the camera image sequence; and replacing the second pixel data value at the predetermined position in the second camera image with a pixel data value, which is in a predetermined relationship to the first pixel data value and/or the third pixel data value. The replacement may be implemented, e.g., by interpolating the second pixel data value with the first or third pixel data value or a combination of the first and third pixel data values. In addition, the second pixel data value may be replaced with the first or third pixel data value.

The present invention further provides a device for detecting an interfering object, the device being configured to perform or implement the steps of the method according to the present invention. In particular, the device may have mechanisms that are configured to execute one step each, and/or the steps, of the method. This specific embodiment of the present invention in the form of the device also may allow the objective forming the basis of the present invention to be achieved rapidly and efficiently.

In the case at hand, the device may be understood as an electric device that processes sensor signals and outputs control signals as a function thereof. The device may have an interface, which may be implemented as hardware and/or software. In a hardware design, the interfaces may, for example, be part of a so-called system ASIC, or an FPGA that contains various functions of the device. However, it is also possible for the interfaces to be separate, integrated circuits or to be at least partially made up of discrete components. In a software design, the interfaces may be software modules that are present on a microcontroller in addition to other software modules, for example.

Also advantageous is a computer program product having program code, which is stored on a machine-readable medium such as a semiconductor memory, a hard-disk memory or an optical memory and is used to implement the method according to one of the specific embodiments described above, when the program is executed in a control device.

DETAILED DESCRIPTION OF THE INVENTION

Figure 1:
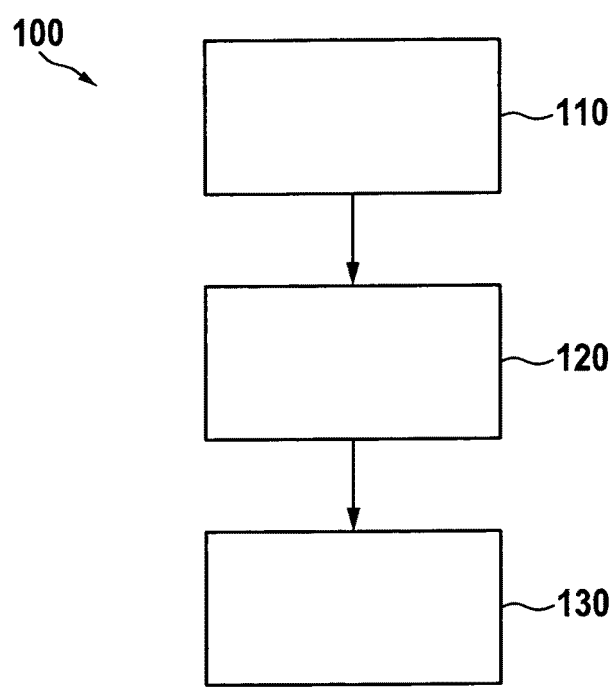
FIG. 1 shows a flow chart of a method for detecting an interfering object in a camera image sequence, according to an exemplary embodiment of the present invention.

In the figures, identical or functionally equivalent elements are provided with the same reference numerals and are described only once. Furthermore, the figures in the drawing, their description and the claims contain numerous features in combination. In this context, it is clear to one skilled in the art that these features may also be considered individually or may be combined to form further combinations not explicitly described here. In the following description, the present invention may also be explained using different sizes and dimensions, although the present invention is not to be understood as being limited to these sizes and dimensions. In addition, method steps of the present invention may be executed repeatedly, as well as in an order other than that described. If an exemplary embodiment includes an "and/or" conjunction between a first feature/step and a second feature/step, then this can be read to mean that according to a specific embodiment, the exemplary embodiment has both the first feature/ the first step and the second feature/the second step, and that according to a further specific embodiment, the exemplary embodiment either has only the first feature/step or only the second feature/step.

The following descriptions in connection with the figures are to be understood as exemplary embodiments; they are not intended to limit the general applicability. The examples described below may be (apart from other variants) implemented as prototypes, in order to establish applicability in practice. In the following, several typical results are shown in the figures in light of actual image data. A sudden occurrence and subsequent disappearance of an interfering object at a location is, for example, characterizable in the image in that the brightness, or alternatively the color, of an image changes and then returns again to approximately the original value. As an alternative to the change in the brightness or color, a change of a feature formed by brightness values and/or chromaticities of more than one pixel may also be used for the characterization. In addition, in particular, pixels situated positionally and/or temporally close together may be taken into consideration and, for example, combined with one another by weighted addition, subtraction, multiplication or division, in order to thus form the feature. The feature may be assigned a coordinate (x,y,t), e.g., by averaging or calculating a minimum over the pixels involved.

A gray scale value or color component value or feature $g(x,y,t)$ having a pixel coordinate $(x,y)$ and a scanning time or a scanning instant t is considered. A variable $d_g$ having index g for "even"

$$d_g(x,y,t) - \tfrac{1}{2}g(x,y,t-\tau) + g(x,y,t) - \tfrac{1}{2}g(x,y,t+\tau) \quad (1)$$

is a measure, possibly encumbered with an algebraic sign, of a sudden change in the image at time t compared to the preceding and succeeding images (that is, at times $t-\tau$ and $t+\tau$). In this context, the variable $\tau$ normally denotes an image refresh rate or an integral multiple thereof.

A variable $d_u$ having index u for "odd"

$$d_g(x,y,t) = -g(x,y,t-\tau) + g(x,y,t+\tau) \quad (2)$$

is, in comparison, a measure, possibly encumbered with an algebraic sign as well, of a change at the same location and time, without taking the sudden event into account.

If $|d_g(x,y,t)|$ is large and $|d_u(x,y,t)|$ is small, then a sudden change occurred at pixel (x,y) at time t, the sudden change being able to be caused by an interfering object.

If both $|d_g(x,y,t)|$ and $|d_u(x,y,t)|$ are large, then such a conclusion may not be drawn, at least for time t.

If $|d_g(x,y,t)|$ and $|d_u(x,y,t)|$ are small, then an approximately steady-state case exists, the normal case.

Thus, it is useful to consider the ratio or the difference of the absolute values, i.e., $|d_g|/|d_u|$ or $|d_g|-|d_u|$, and possibly compare it to a threshold value. At the same time, it is useful to compare the value $|d_g|$ to a further, separate threshold value that may optionally be adaptively adjusted to the image content. This second threshold value may be a significance threshold value, which may be used, in the calculation of the ratio or the difference, to disregard small absolute changes in the absolute values that may be based on, e.g., occasional measuring errors, which means that the system may operate in a sufficiently robust manner.

Instead of the subtraction in (1) and (2), other measures of separation may also be used, such as the quotient or the combination of nonlinear functions and a difference or quotient calculation. At this point, it is emphasized that a logarithmic calculation (which is often internally approximated by highly dynamic cameras) with subsequent subtraction of two gray scale values is synonymous to dividing the gray scale values.

In the case of evaluating the relationship of $d_g(x,y,t)$ and $d_g(x,y,t)$, a distance to a threshold value may also be calculated as an alternative to the threshold value calculation (with a binary answer). This forms a continuous measure of the presence of the interfering object. Such a measure was also used for the image examples shown in the following figures.

Various uses become apparent for a method and a device according to the approach presented here. Thus, for example, snowflakes, hailstones, raindrops, in particular, large raindrops, leaves, insects, birds, packaging materials flying around and the like, but also dirt and ash particles, balls, projectiles, etc. may be detected in an area in front of the vehicle. It is also possible to detect the windshield wiper in the image, for it also executes similarly large movements in the image, as described above. Furthermore, it is possible to positionally localize all of the above-mentioned interfering objects, e.g., by specifying all picture elements or pixels, which are covered by an interfering object in the respective image. Instead of a binary description, at least one continuous-value description may also be used, which, for example, states how marked the concealment is, that is, e.g., considers a degree of transparency, or states how sharp the change in brightness is due to the concealment, or how reliable the algorithm is with regard to the presence of an instance of concealment at the pixel in question. Furthermore, the approach of the present invention may allow the concealment to be eliminated, e.g., by replacing the concealed pixels using the gray scale values or colors of pixels from preceding or succeeding images and/or of pixels in the positional vicinity, in the current image as well. The exemplary embodiments described below with the aid of FIGS. 2 through 7 relate to detection and elimination of snowfall, as well as a windshield wiper motion in the camera image sequence.

FIG. 1 shows a flow chart of a method 100 for detecting an interfering object in a camera image sequence, according to an exemplary embodiment of the present invention. According to the exemplary embodiment presented here, the camera image sequence includes three video images of a scene in front of the windshield of a vehicle, which were picked up in succession at three different instants or times. Method 100 is also implementable using a camera sequence having a different number of camera images. In a first step 110, a first pixel data value, a second pixel data value and a third pixel data value are provided to a control unit in which method 100 is executed. The three pixel data values respectively relate to one and the same predetermined position in each of the three camera images, the position representing a point in the surroundings of the vehicle. The control unit may be a device in which an algorithm is saved, by which algorithm, for example, the three pixel data values may be correlated with each other in light of their gray scale value and the pick-up time in such a manner, that it may be determined if, e.g., the second pixel data value represents an interfering object in the second camera image. In a subsequent step 120, a reference value and a comparison value are ascertained in the control unit, using the algorithm. In this context, the reference value may be based on the second pixel data value, and the comparison value may be based on the first and third pixel data values, assuming that the first and third pixel data values are situated, for example, inside a common tolerance range. In a step 130 following step 120, the interfering object in the second camera image may be detected at the predetermined position, when the reference value is in a predefined relationship with the comparison value. The predefined relationship may be, for example, that a distance between the reference value and the comparison value exceeds a predetermined threshold value.

Figure 2:
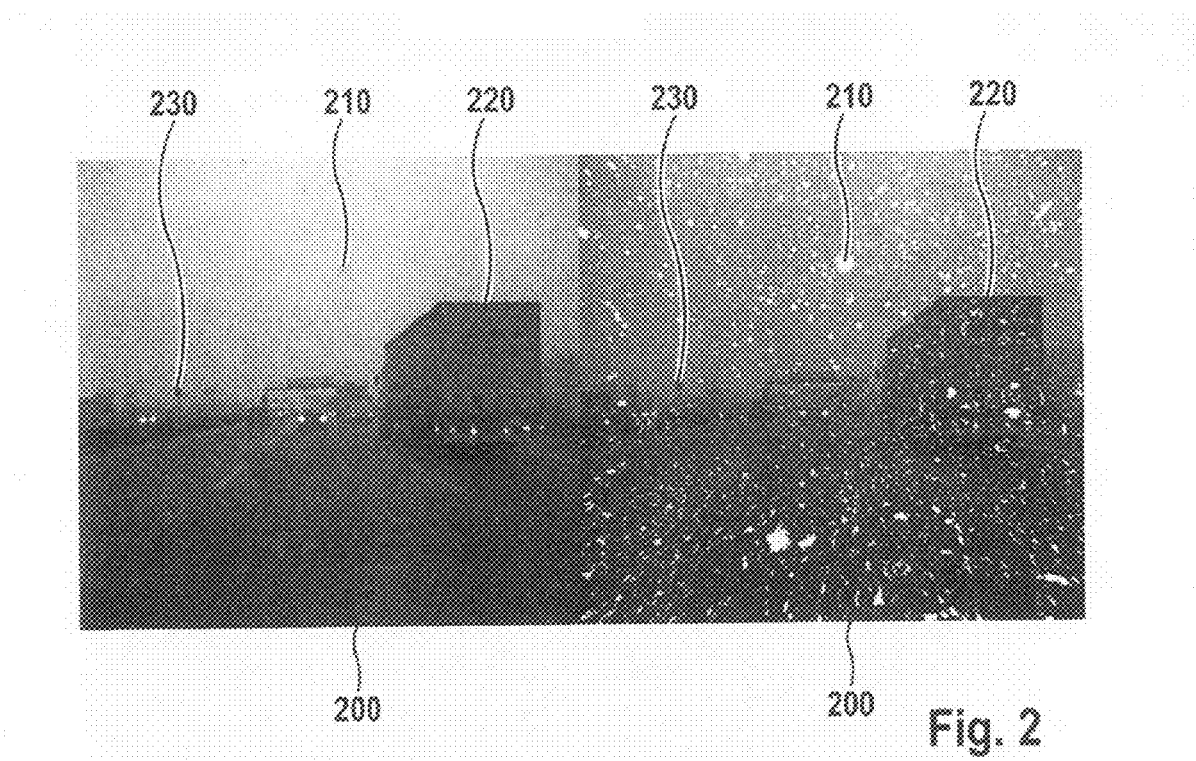
FIG. 2 shows a comparison of an image detail from an original image of a driver assistance camera and a representation of a localization of detected pixels affected by an instance of concealment as a result of snowfall, according to an exemplary embodiment of the present invention.

FIG. 2 shows a comparison of an image detail from an original image 200 of a driver assistance camera and a representation of image 200, including a localization of detected pixels affected by an instance of concealment as a result of snowfall, according to an exemplary embodiment of the present invention. Represented is a situation in which heavy snow is just starting to fall on a multi-lane road having a traffic-lane boundary with respect to an opposite lane to the left in respective image 200.

A central image detail of original image 200 of a driver assistance camera is shown on the left side of FIG. 2. A result of an algorithm according to the exemplary embodiment is visualized in camera image 200 on the right side of FIG. 2. The algorithm is configured to detect and localize the pixels in the camera image that are affected by concealment. In the exemplary embodiment shown in FIG. 2, the affected pixels are concealed by interfering objects 210 in the form of snowflakes of various sizes and thicknesses, of which, for the sake of clarity, only one is assigned a reference numeral. In the right image of the representation in FIG. 2, the interfering objects 210 detected and localized according to the algorithm of the present invention are marked on camera image 200 in color or via an increase in gray scale value. A saturation of the coloration or gray scale value intensity is a measure of the change in the brightness at the specific pixel. In a camera image sequence used according to the method, the image shown in FIG. 2 represents the second camera image in a sequence of three camera images. A truck 220 driving ahead and a street sign 230 on a center line of the represented lanes are also emphasized in the scenery of the vehicle surroundings shown here; according to the approach presented here, the truck and the street sign not being intended to be recognized as interfering objects.

A combination with egomotion data is also of significance in connection with the camera image sequence needed for the method. If the camera executes a translational and/or, in particular, rotational egomotion between image pick-ups 200, this has an effect on camera image 200 of the scene. The image positions of scene objects 220, 230 are displaced. If this camera movement relative to the scene is known, then it can be compensated for by calculation. There are different options for providing the motion data required to compensate for the egomotion. Along these lines, an inertial sensor system, e.g., inertial sensors using, in particular, rotation rate sensors and acceleration sensors, may be used for a movement about and/or along one or more axes. Furthermore, use of spring displacement sensors, e.g., level sensors, in the vehicle is sensible, in particular, for measuring rolling and pitching motions. Wheel sensors in the vehicle, preferably on the right and on the left, may be used for determining a yawing motion from the difference. Use of a steering angle sensor is also practical. In addition, there is the possibility of estimating the egomotion from the image sequence. This is an advantageous design approach, because it ensures high accuracy and independence, and possible problems regarding the time synchronization and geometric calibration may be prevented.

As an alternative to the combination with egomotion data, a combination with a motion estimation may also be implemented. In higher-performance computer vision systems, it is customary to additionally utilize methods for estimating movement. In combination with the method for detecting interfering objects, there is the question of the order in which the two are to be combined with one another, for each of the two methods may benefit from the results of the other. If interfering objects 210 are initially detected, these may be excluded from the motion estimation. However, if the motion estimation is initially made, then known scene objects 220, 230 and their motion data and the entire field of motion may be made available to the method for detecting interfering objects. Thus, the interfering object detection system may carry out motion compensation for the preceding and succeeding images 200 prior to the internal subtractions. Consequently, moving, textured image regions may be prevented from causing false detections. Furthermore, as a rule, motion estimation algorithms can determine if no matching correspondence can be found within the search region. Therefore, support or plausibility checking of the interfering object detection is possible. It is always useful to combine the interfering object detection and the motion estimation with one another.

In the method of the present invention introduced here, there is a latency time $\tau$ of an image period. Therefore, the information about the presence and position of interfering objects 210 is mostly only available with an image 200 delay. This is not a problem for some applications, but the latency time should be kept to a minimum for others. To this end, different design approaches may be considered.

In object detection methods, an object should be verified by a plurality of observations in order to be regarded as valid. Then, the knowledge of interfering objects 210 delayed by one image may still be utilized subsequently to invalidate presumably validated objects again.

In motion estimation methods, the contents of two consecutive images are typically compared to one another. If there is already knowledge of interfering objects 210 from the older of the two images, as is the case in connection with the exemplary embodiments described here, then this is sufficient for eliminating motion vector candidates that begin at interfering objects 210.

A compromise design approach not having latency time results from changing the order regarding the use of the three images 200. If one requires a small change between $t-2\tau$ and $t-\tau$ and a large change between $t-\tau$ and $t$ for the detection of an interfering object, then at least suddenly occurring changes may be detected, if not their immediately subsequent disappearance.

A combination of the two above-mentioned methods, i.e., of the order according to the exemplary embodiments described in the figures, as well as the changed order, is useful in connection with the motion estimation, since in this case, preceding image 200 and current image 200 may be processed differently.

At night, snowflakes 210 are illuminated by the headlights of the reference vehicle and are therefore almost always brighter that the surroundings concealed by them. Using this previous knowledge, only two instead of three images 200 are necessary for the detection, in order to ascertain the image 200 in which the snowflake 210 in question is present, and the one in which it is absent, for the presence is always associated with a sudden, positive change in brightness. The following shall be repeated here again for a better understanding: by day, there are bright flakes 210 on a dark background, e.g., the road, and dark flakes 210 on a bright background, e.g., the sky. If one calculates the difference of two images 200, the location of snow flake 210 may indeed be unequivocally determined, but not in which of the two images it is present or absent.

Furthermore, in this connection, it is advantageous to utilize the unsharpness due to movement. If, in image 200, interfering objects 210 are in the vicinity of the camera and a long distance is traveled during the exposure time, interfering object 210 is depicted in a blurry manner because of the unsharpness due to movement. This fact may be utilized for validation or for estimating further unknowns. For example, at a particular driving speed and/or particular relative wind speed and direction, flakes 210 execute a typical path movement along flow lines in front of and above the vehicle. Assuming approximately laminar flow, the path of these movements is predictable and observable. This may be utilized for validating the snowfall detection. Furthermore, when the egomotion is known, e.g., via individual wheel speeds, a yaw rate, GPS coordinates, a compass, etc., the wind direction may be determined from the observable relative motion of the flakes. In addition, in the case of a known relative speed, a distance and, in particular, an approximate size of flake 210 may also be calculated, using a monocular camera, from a longitudinal-lateral aspect ratio of the flake 210 portrayed in an unsharp manner due to movement.

Figure 3:
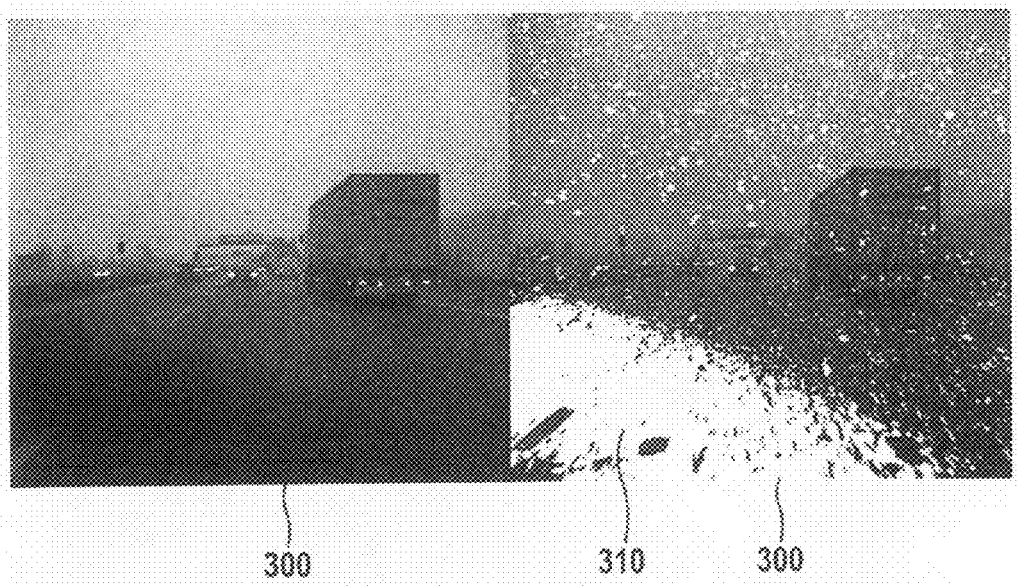
FIG. 3 shows a comparison of a further original image and a representation of a localization of detected pixels affected by an instance of concealment as a result of a windshield wiper movement, according to an exemplary embodiment of the present invention.

FIG. 3 shows a comparison of a further original image 300 of surroundings of a vehicle and a representation of a localization of detected pixels affected by an instance of concealment as a result of a windshield wiper movement, according to an exemplary embodiment of the present invention. Further original image 300 may have been picked up by the driver assistance camera, e.g., shortly before or after the camera image discussed in connection with FIG. 2. Apart from the slight deviations due to the variation with time, it shows the same scenery in front of the windshield of the vehicle. In the camera image 300 shown on the left in the representation in FIG. 3, it is schematically shown, in the lower left corner of the image, how the windshield wiper appears in image 300: the representation of camera image 300 on the right in FIG. 3 clearly shows that large-area, interfering objects 310 that suddenly appear, such as the windshield wiper, may also be reliably detected by the algorithm.

Figure 4:
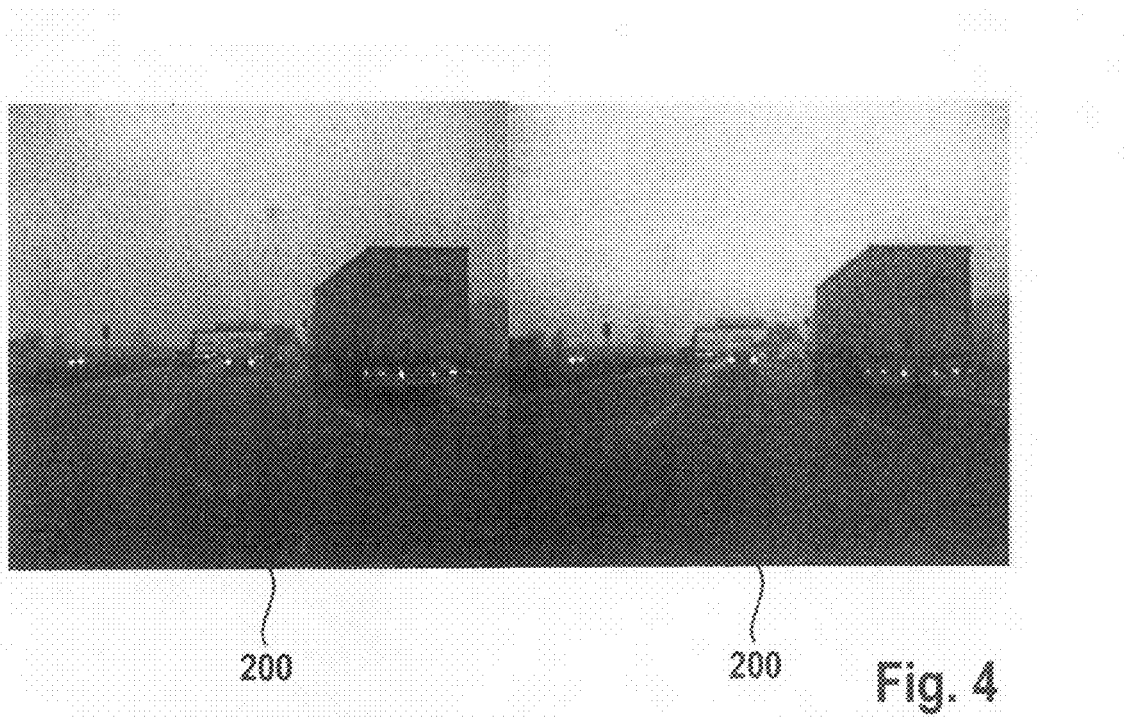
FIG. 4 shows a comparison of the original image of FIG. 2 and a representation of the image detail with substitutions of the pixels affected by the concealment, according to an exemplary embodiment of the present invention.

FIG. 4 shows a comparison of original image 200 of FIG. 2 and a representation of image detail 200 with substitutions of the pixels affected by the concealment, according to an exemplary embodiment of the present invention. In the representation of camera image 200 on the right in FIG. 4, it is apparent that a substitution of the gray scale values was undertaken at the pixel positions that were previously marked with a very dark color. To that end, the gray scale values from the preceding and/or succeeding image were used here. The interfering objects may be replaced, for example, by positional or temporal interpolation, or by direct replacement of the pixel data values in question by corresponding pixel data values from other images.

As shown in FIG. 4, the interfering object detection may be used for replacing the gray scale value or the chromaticity at the pixels affected by the concealment, e.g., with values from the local, positional vicinity, which may be referred to as positional interpolation, or in accordance with a temporal interpolation using values from the temporal vicinity of the pixel data value in question, from preceding or succeeding images. Combinations of the two are also possible. This yields various advantages. Thus, the presence of interfering objects no longer has to be considered in a subsequent image processing algorithm, since they were already eliminated. The human observer may monitor such a cleaned-up camera image sequence longer without fatigue. Furthermore, the cleaning may allow the compressibility to improve. From an information-theory point of view, suddenly occurring events have a high information content, and when they must be encoded, they result in a higher requisite bit rate and a higher memory requirement for saving and transmitting images. On top of that, the mostly unwanted, additional information would result, at this point, in higher storage and transmission costs. The prior elimination according to the above-mentioned design approach prevents this. Surveillance cameras are a possible application. In the case of motionless cameras and scenes that are almost static, the possible savings due to the cleaning are particularly high.

Figure 5:
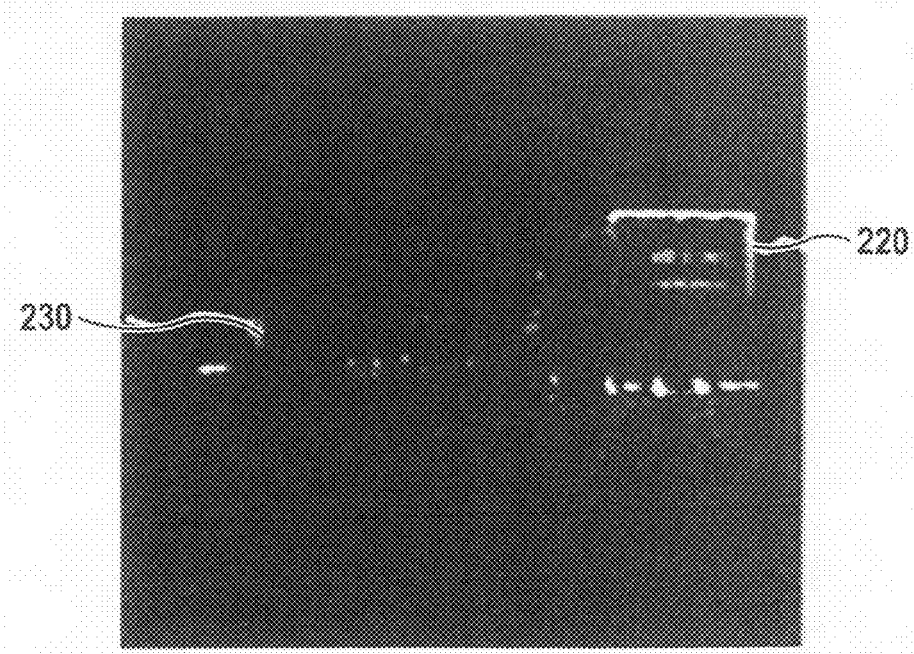
FIG. 5 shows a representation of a detail from the original image of FIG. 2 after high-pass filtering, according to an exemplary embodiment of the present invention.

FIG. 5 shows a representation of a detail from the original image of FIG. 1 after high-pass filtering, according to an exemplary embodiment of the present invention. Edges of truck 220 and road sign 230 that run essentially horizontally and vertically are shown. A signal acquired from the high-pass image may be used for suppressing the detection at high-contrast and moving image areas.

The evaluation described in connection with FIGS. 2 through 4 considers the specific pixel independently of its surroundings in the image. However, it may be of advantage to consider a local vicinity of the pixel in the same image, as well. For if the local contrast is high, then a relative movement of a scene object 220, 230, e.g., that of a passing vehicle, may also produce a large value for $|d_g(x,y,t)|$ and a small value for $|d_u(x,y,t)|$, e.g., because a dark line on a bright background moves through under the pixel. In order to prevent this case of false detection, it is useful to take the local contrast into account in the detector in a suitably attenuating form. This may be achieved, for example, by incorporating the magnitude of the high-pass-filtered image signal, e.g., from a current image or one or more preceding image(s) or succeeding image(s) or combinations thereof, into the detection signal, e.g., by subtraction, such that the high-pass-filtered image signal is attenuated in a locally smoothed manner. This was also performed for the example images shown with the aid of FIGS. 2 through 4.

An example of the weakening signal is shown in FIG. 5. This procedure also has the advantage that pulsed LED vehicle lamps, which produce a pulsating appearance in the image under certain conditions such as pulse frequency, mark-to-space ratio, camera scanning frequency, exposure time and relative phase angle, do not result in false detections. Indeed, the use of the attenuation results in snowflakes in front of a high-contrast, moving background not being detected. However, this can be tolerated in some applications. In particular, the human observer is relatively insensitive to errors that are hidden in high-contrast surroundings. Examples of this include a motor-vehicle night vision assistance system having a video display or a video display or video recorder in the monitoring technology equipment.

Figure 6:
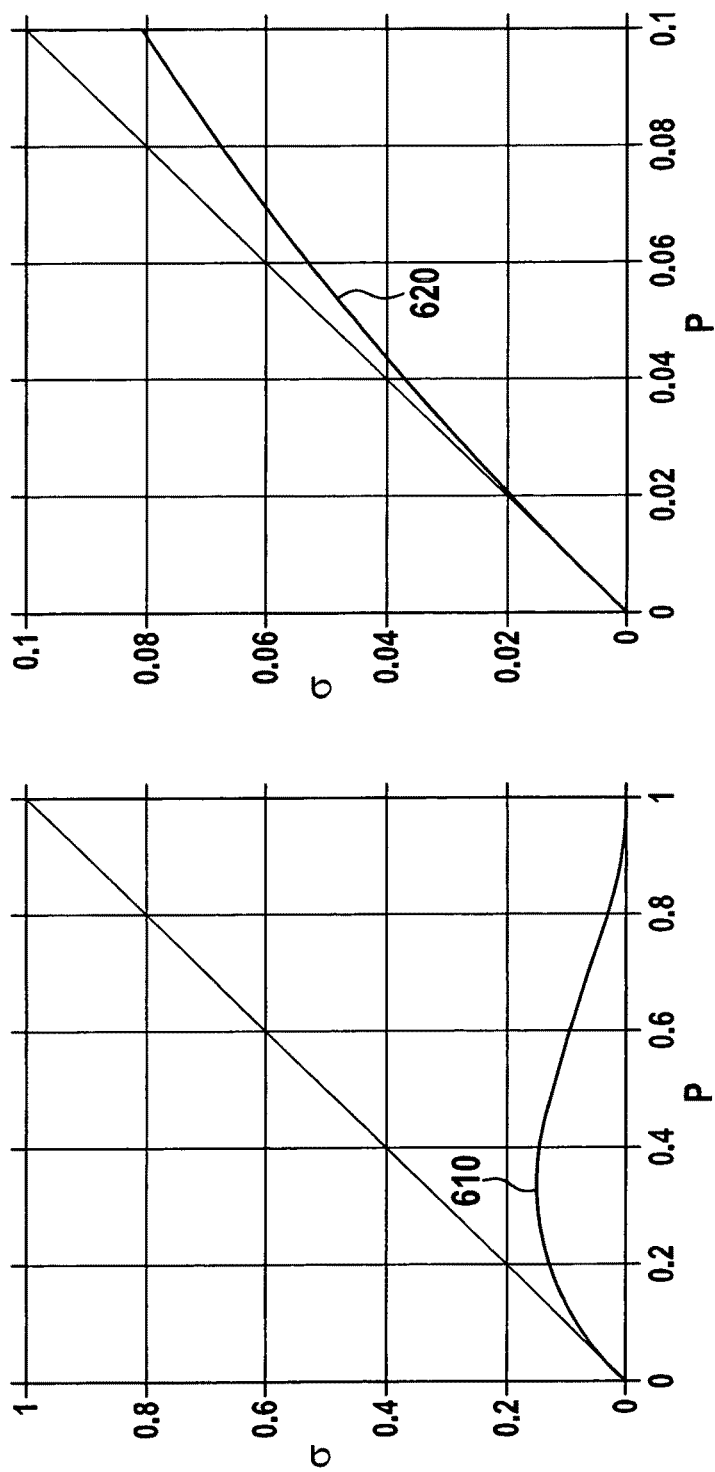
FIG. 6 shows two coordinate systems for clarifying a relationship between a measured snow density in the image and an actual snow density in the image.

FIG. 6 shows two diagrams having coordinate systems for clarifying a relationship between a measured snow density in the image and an actual snow density in the image. In this context, the snow density in the image denotes, for example, the number of pixels concealed by a detectable snowflake in relation to the total number of pixels in the image. A snow density in the image may be converted into a snow density in the air. In the following, the abbreviated designation, snow density, is always to be understood as the snow density in the image. Shown in each diagram is a coordinate system, in which an actual snow density p and a measured snow density q are plotted on the abscissa and the ordinate, respectively. Using the approach described here, the measured snow density may be ascertained, for example, by evaluating the number of positions in the camera image recognized as an interfering object.

In the coordinate system on the left in the representation of FIG. 6, values between 0 and 1 that each correspond to percent values from 0% to 100% are plotted on the abscissa, as on the ordinate. In the coordinate system on the right in the representation, values between 0 and 0.1 that each correspond to percent values from 0% to 10% are plotted on the abscissa, as on the ordinate. A graph 610 in the coordinate system on the left in the representation initially climbs from the origin of the coordinate system in a wavelike manner, in order to subsequently approach the abscissa again and finally coincide with it. In contrast to that, a graph 620 in the coordinate system on the right in the representation has a relatively uniform, continuous slope from the origin of the coordinate system to an end point of 0.1 on the abscissa and 0.08 on the ordinate. In this context, the coordinate system on the right in the representation in FIG. 6 represents an enlarged detail from the coordinate system on the left.

In connection with the detection and removal of snowfall and interfering objects in image sequences that is represented here, let it be emphasized that some applications, such as a heater drive circuit of the radar sensor, do not require any information about a position of the individual snow flakes or interfering objects in the image, but only a scalar measure, e.g., an average snow density in the image. To this end, e.g., a ratio of the number of pixels concealed by interfering objects of a minimum size to the total number of all the pixels, including, if indicated, a weighting function, is taken. As the two coordinate systems in FIG. 6 illustrate, using a method from the exemplary embodiments according to the figures explained above, a systematic error may be generated at high snow densities, since for the detection of the interfering object by means of three observations, two observations, namely, the preceding image and the succeeding image, must always be interference-free. In the following, the true snow density is denoted by p, and the measured snow density is denoted by q. Going by the normally permissible assumption that two consecutive interfering events at a pixel occur statistically independently of one another and are described exclusively by probability of occurrence p, then the probability that pixels can be observed in succession to be interference-free, then interfered with, then interference-free again, is $$q=(1-p)\cdot p\cdot(1-p) \quad (3).$$

Consequently, e.g., a correction rule may be generated, in order to ascertain correct density p from measured density q. The interrelationship of p and q is graphically illustrated in FIG. 6. It is discernible that deviations in snow densities in the single-digit percent range, which represents the main application case, are still small. However, at snow densities over 10% and, in particular, beyond 30%, considerable deviations between p and q may be detected.

Figure 7:
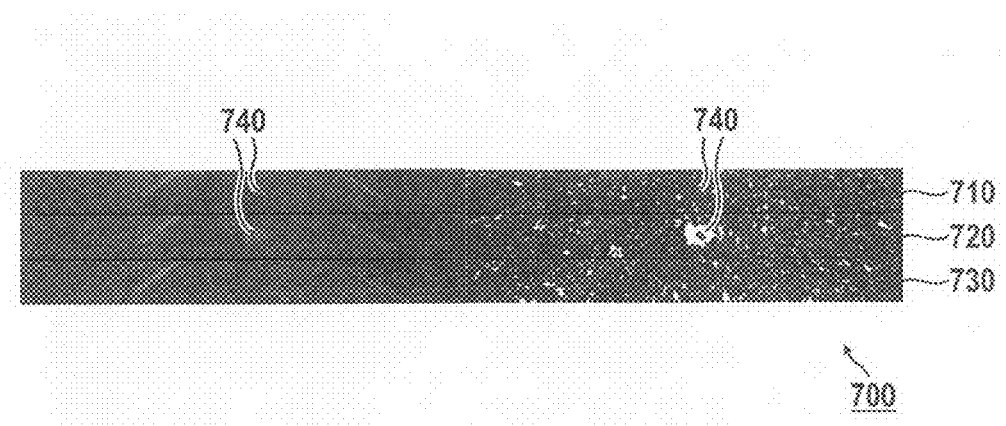
FIG. 7 shows three consecutive image details of a camera image sequence for illustrating a limiting case of a detection of an interfering object, according to an exemplary embodiment of the present invention.

FIG. 7 shows a limiting case of the detection of an interfering object in light of a fixed detail in three consecutive images of a camera image sequence 700, according to an exemplary embodiment of the present invention. Camera image sequence 700 is made up of three camera images 710, 720, 730 picked up by the camera in succession. In each of images 710, 720, 730, the actual camera image is compared, in turn, to the image having, e.g., a colored designation of the detected interfering objects. Since a large snowflake in the form of an interfering object 740 randomly moves exactly along a line of sight towards the camera and therefore appears multiple times at the same location in images 710 and 720, the model of the disturbance that suddenly appears and disappears again does not apply to it. The disturbance is then not detected or only partially detected.

Something similar was already able to be observed in FIG. 3: in the marking of the windshield wiper, gaps appear exactly where interfering objects are situated in the preceding or succeeding image.

Figure 8:
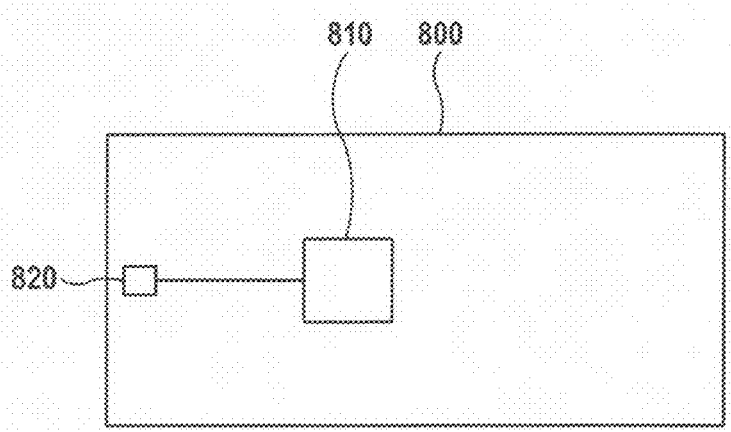
FIG. 8 shows a basic representation of a device for detecting an interfering object in a vehicle, according to an exemplary embodiment of the present invention.

FIG. 8 shows a basic representation of a device for detecting an interfering object in a vehicle, according to an exemplary embodiment of the present invention. A vehicle 800, in which a device 810 for detecting an interfering object is situated, is shown. Also shown is a driver assistance camera 820 in a front region of vehicle 800, the driver assistance camera being configured to take pictures of traffic scenery in front of vehicle 800 and to transmit corresponding image data to device 810. There, the image data may be utilized for detecting and/or eliminating interfering objects, using a suitable algorithm.

In connection with the approach of the present invention explained above, it may be useful to combine the detection of snowfall with a thermometer and/or a moisture sensor. Furthermore, in a stereo vision system, corresponding image areas between a first and at least one second camera may be searched for, in order to calculate a distance to the corresponding "world points" (i.e., real positions of objects in front of the vehicle), using triangulation. If interfering objects, as they were described here, are present, then the correspondence determination fails at these locations, which leads to measuring errors in the most unfavorable case. Using the method presented here, the two camera images are initially checked for interfering objects, and these image regions are excluded from further processing. In this manner, erroneous measurements are prevented. In addition, the color of snow may be used for detecting it. A snowflake is white and scatters the ambient light in a wide-angled manner. Therefore, it has precisely the color that a white-balanced color camera uses as a white reference. This criterion may be used, for example, to rule out brightly colored image areas as candidates for snowflakes. In addition, further applications for the method of the present invention and the device of the present invention are conceivable, e.g., for snowcats or for ships navigating in harbors, also for vehicles and machines in environments in which there is a risk of parts flying around, etc.

What is claimed is:

1. A method for detecting an interfering object in at least one camera image of a camera image sequence, comprising:
    reading in a first pixel data value at a predetermined position in a first camera image obtained at a first point in time, a second pixel data value at the predetermined position in a second camera image obtained at a second point in time after the first point in time, and a third pixel data value at the predetermined position in a third camera image obtained at a third point in time after the second point in time;
    ascertaining (i) a reference value on the basis of the second pixel data value and (ii) a comparison value on the basis of at least one of the first pixel data value and the third pixel data value; and
    detecting the presence of the interfering object at the predetermined position if the reference value is in a predefined relationship with the comparison value.

2. The method as recited in claim 1, wherein the presence of the interfering object at the predetermined position is detected when the first pixel data value and the third pixel data value each have a value which is within a predefined, common tolerance range.

3. The method as recited in claim 1, wherein the presence of the interfering object at the predetermined position is detected when a first ratio of the reference value to the comparison value is within a predefined tolerance range for a second ratio of the reference value to a further comparison value determined on the basis of the third pixel data value.

4. The method as recited in claim 1, wherein the presence of the interfering object at the predetermined position is detected when the reference value differs from the comparison value by more than a predefined quantity.

5. The method as recited in claim 1, wherein in the detecting of the presence of the interfering object, one of a difference or a ratio of the reference value and the comparison value is calculated for the predetermined relationship.

6. The method as recited in claim 1, wherein in the detecting of the presence of the interfering object, a difference determined between the reference value and at least one of (i) the comparison value and (ii) a further comparison value determined on the basis of the third pixel data value, in order to discern a probability of the presence of the interfering object at the predetermined position on the basis of the difference.

7. The method as recited in claim 1, further comprising:
defining at least one one-dimensional structure in at least one camera image of the camera image sequence;
wherein no interfering object is determined to be present at the predetermined position if the at least one one-dimensional structure was defined at the predetermined position.

8. The method as recited in claim 1, further comprising:
detecting a snow density based on a ratio of (i) a number of predetermined positions at which interfering objects were detected, to (ii) a number of positions in a camera image.

9. The method as recited in claim 1, further comprising:
defining at least one one-dimensional structure in at least one camera image of the camera image sequence; and
detecting a snow density based on a ratio of (i) a number of predetermined positions at which interfering objects were detected, to (ii) a number of positions in a camera image;
wherein no interfering object is determined to be present at the predetermined position if the at least one one-dimensional structure was defined at the predetermined position, and
wherein the presence of the interfering object at the predetermined position is detected when the first pixel data value and the third pixel data value each have a value which is within a predefined, common tolerance range.

10. The method as recited in claim 1, further comprising:
defining at least one one-dimensional structure in at least one camera image of the camera image sequence; and
detecting a snow density based on a ratio of (i) a number of predetermined positions at which interfering objects were detected, to (ii) a number of positions in a camera image;
wherein no interfering object is determined to be present at the predetermined position if the at least one one-dimensional structure was defined at the predetermined position,
wherein the presence of the interfering object at the predetermined position is detected when the reference value differs from the comparison value by more than a predefined quantity, and
wherein in the detecting of the presence of the interfering object, one of a difference or a ratio of the reference value and the comparison value is calculated for the predetermined relationship.

11. The method as recited in claim 1, further comprising:
defining at least one one-dimensional structure in at least one camera image of the camera image sequence; and
detecting a snow density based on a ratio of (i) a number of predetermined positions at which interfering objects were detected, to (ii) a number of positions in a camera image;
wherein no interfering object is determined to be present at the predetermined position if the at least one one-dimensional structure was defined at the predetermined position,
wherein the presence of the interfering object at the predetermined position is detected when a first ratio of the reference value to the comparison value is within a predefined tolerance range for a second ratio of the reference value to a further comparison value determined on the basis of the third pixel data value.

12. The method as recited in claim 1, further comprising:
defining at least one one-dimensional structure in at least one camera image of the camera image sequence; and
detecting a snow density based on a ratio of (i) a number of predetermined positions at which interfering objects were detected, to (ii) a number of positions in a camera image;
wherein no interfering object is determined to be present at the predetermined position if the at least one one-dimensional structure was defined at the predetermined position,
wherein the presence of the interfering object at the predetermined position is detected when the reference value differs from the comparison value by more than a predefined quantity, and
wherein in the detecting of the presence of the interfering object, one of a difference or a ratio of the reference value and the comparison value is calculated for the predetermined relationship.

13. The method as recited in claim 1, further comprising:
defining at least one one-dimensional structure in at least one camera image of the camera image sequence; and
detecting a snow density based on a ratio of (i) a number of predetermined positions at which interfering objects were detected, to (ii) a number of positions in a camera image;
wherein no interfering object is determined to be present at the predetermined position if the at least one one-dimensional structure was defined at the predetermined position,
wherein the presence of the interfering object at the predetermined position is detected when the reference value differs from the comparison value by more than a predefined quantity, and
wherein in the detecting of the presence of the interfering object, a difference determined between the reference value and at least one of (i) the comparison value and (ii) a further comparison value determined on the basis of the third pixel data value, to discern a probability of the presence of the interfering object at the predetermined position on the basis of the difference.

14. A method for eliminating an interfering object in a camera image sequence, comprising:
detecting an interfering object in at least one camera image of a camera image sequence by:
reading in a first pixel data value at a predetermined position in a first camera image obtained at a first point in time, a second pixel data value at the predetermined position in a second camera image obtained at a second point in time after the first point in time, and a third pixel data value at the predetermined position in a third camera image obtained at a third point in time after the second point in time;
ascertaining (i) a reference value on the basis of the second pixel data value and (ii) a comparison value on the basis of at least one of the first pixel data value and the third pixel data value; and detecting the presence of the interfering object at the predetermined position if the reference value is in a predefined relationship with the comparison value; and replacing the second pixel data value at the predetermined position in the second camera image with a pixel data value which is in a predetermined relationship with at least one of the first pixel data value and the third pixel data value.

15. A system for detecting an interfering object in at least one camera image of a camera image sequence, comprising:

a device configured to read in a first pixel data value at a predetermined position in a first camera image obtained at a first point in time, a second pixel data value at the predetermined position in a second camera image obtained at a second point in time after the first point in time, and a third pixel data value at the predetermined position in a third camera image obtained at a third point in time after the second point in time;

a device configured to ascertain (i) a reference value on the basis of the second pixel data value and (ii) a comparison value on the basis of at least one of the first pixel data value and the third pixel data value; and a device configured to detect the presence of the interfering object at the predetermined position if the reference value is in a predefined relationship with the comparison value.

16. A non-transitory computer-readable data storage device storing a computer program having program codes which, when executed on a computer, perform a method for detecting an interfering object in at least one camera image of a camera image sequence, the method comprising:

reading in a first pixel data value at a predetermined position in a first camera image obtained at a first point in time, a second pixel data value at the predetermined position in a second camera image obtained at a second point in time after the first point in time, and a third pixel data value at the predetermined position in a third camera image obtained at a third point in time after the second point in time;

ascertaining (i) a reference value on the basis of the second pixel data value and (ii) a comparison value on the basis of at least one of the first pixel data value and the third pixel data value; and detecting the presence of the interfering object at the predetermined position if the reference value is in a predefined relationship with the comparison value.

* * * * *